United States Patent
Alshawabkeh et al.

(10) Patent No.: US 10,049,053 B1
(45) Date of Patent: Aug. 14, 2018

(54) CLASSIFYING PERFORMANCE OF AN EXTERNAL STORAGE RESOURCE POOL ASSOCIATED WITH A PERFORMANCE TIER IN A FEDERATED TIERED STORAGE SYSTEM FOR OVERLOAD AVOIDANCE AND AUTO-TIERING

(71) Applicant: EMC Corporation, Hopkinton, MA (US)

(72) Inventors: Malak Alshawabkeh, Franklin, MA (US); Owen Martin, Hopedale, MA (US); Xiaomei Liu, Southborough, MA (US); Sean Dolan, Belmont, MA (US); Hui Wang, Upton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 161 days.

(21) Appl. No.: 14/985,518

(22) Filed: Dec. 31, 2015

(51) Int. Cl.
*G06F 13/00* (2006.01)
*G06F 12/0897* (2016.01)
*G06F 3/06* (2006.01)

(52) U.S. Cl.
CPC ........ *G06F 12/0897* (2013.01); *G06F 3/0613* (2013.01); *G06F 3/0629* (2013.01); *G06F 3/0653* (2013.01); *G06F 3/0683* (2013.01); *G06F 3/061* (2013.01); *G06F 3/0604* (2013.01); *G06F 3/0631* (2013.01); *G06F 2212/60* (2013.01)

(58) Field of Classification Search
CPC .. G06F 12/0897; G06F 3/0683; G06F 3/0629; G06F 3/0613; G06F 3/0653; G06F 2212/60; G06F 3/0631; G06F 3/0604; G06F 3/061

USPC ............... 711/4, 3, 111, 150, 158, 170, 118; 718/105
See application file for complete search history.

(56) References Cited

U.S. PATENT DOCUMENTS

| | | | | |
|---|---|---|---|---|
| 9,354,813 B1* | 5/2016 | Dolan | ............... | G06F 3/0647 |
| 9,612,746 B1* | 4/2017 | Wang | ............... | G06F 3/0604 |
| 9,710,187 B1* | 7/2017 | Si | ............... | G06F 3/065 |
| 2013/0054894 A1* | 2/2013 | Kawaguchi | ........... | G06F 3/0608 711/117 |
| 2013/0080703 A1* | 3/2013 | Kumagai | ............... | G06F 9/5072 711/117 |
| 2013/0138884 A1* | 5/2013 | Kawamura | ......... | G06F 12/0866 711/119 |
| 2015/0326656 A1* | 11/2015 | Guo | ............... | H04L 67/1097 709/226 |
| 2016/0077886 A1* | 3/2016 | Kramer | ............... | G06F 9/5083 718/105 |
| 2016/0350021 A1* | 12/2016 | Matsushita | ......... | G06F 12/0873 |
| 2017/0070574 A1* | 3/2017 | Sawada | ............... | G06F 15/167 |
| 2017/0102874 A1* | 4/2017 | Ouchi | ............... | G06F 3/061 |

(Continued)

*Primary Examiner* — Hong Kim
(74) *Attorney, Agent, or Firm* — Anderson Gorecki LLP (57) ABSTRACT

An external storage resource pool associated with federated tiered storage is associated with at least one performance tier based on evaluated performance of the external storage resource pool. Performance of the external pool may be evaluated in terms of service level expectations or service level objectives. Workload pattern analysis or performance probability curves may be used to classify the external storage resource pool. Workload distribution may be determined by a margin analysis algorithm that matches workloads and storage resource pool performance characteristics.

20 Claims, 10 Drawing Sheets

(56) References Cited

U.S. PATENT DOCUMENTS

2017/0103356 A1\* 4/2017 Sabloniere ........ G06F 17/30312
2017/0116398 A1\* 4/2017 Lehmann ................ G06F 21/31

\* cited by examiner

CLASSIFYING PERFORMANCE OF AN EXTERNAL STORAGE RESOURCE POOL ASSOCIATED WITH A PERFORMANCE TIER IN A FEDERATED TIERED STORAGE SYSTEM FOR OVERLOAD AVOIDANCE AND AUTO-TIERING

BACKGROUND

The subject matter of this disclosure is generally related to data storage systems that are used to maintain relatively large data sets and support a relatively large number of concurrent users. Some aspects are more particularly related to a data storage system that uses automated tiering to exploit the service efficiencies of multiple classes of storage. The basic building blocks of a data storage system may include computing nodes that provide access to data storage devices such as disk drives and flash drives. The data storage devices can be organized into hierarchical tiers. For example, each tier may include storage devices of a particular technology type. In general, different technology types correspond to different performance characteristics. Thus, tiered storage provides multiple storage performance classes. However, federating external storage resources with local storage resources in a data storage system that uses automated tiering may present some problems.

SUMMARY

All examples, aspects and features mentioned in this document can be combined in any technically possible way.

In accordance with an aspect an apparatus comprises: a first data storage system comprising: a computing node; and a plurality of storage resource pools, at least one of the storage resource pools being an external storage resource pool; wherein the first data storage system classifies the storage resource pools as multiple performance tiers and manages extent-level auto-tiering across the performance tiers to avoid overloading performance capacity of the storage resource pools. In some implementations performance of the external storage resource pool is measured in terms of access operations per unit of time. In some implementations performance of the external storage resource pool is measured in terms of access operations per unit of time per unit of utilized storage capacity. In some implementations performance of the external storage resource pool is measured in terms of service level expectations. In some implementations performance of the external storage resource pool is measured in terms of service level objectives. In some implementations performance of the external storage resource pool of the second data storage system is evaluated after that external storage resource pool is loaded with data in an amount calculated to cause cache misses. In some implementations the loaded data is currently infrequently accessed. In some implementations performance pattern analysis is used to classify the external storage resource pool. In some implementations performance probability curves are used to classify the external storage resource pool. In some implementations workload distribution is determined by a margin analysis algorithm that matches workloads and external storage resource pool performance characteristics.

In accordance with an aspect a method comprises: using a first data storage system comprising a computing node and a plurality of storage resource pools, at least one of the storage resource pools being an external storage resource pool: classifying the storage resource pools into multiple performance tiers; and managing extent-level auto-tiering across the performance tiers to avoid overloading performance capacity of the storage resource pools. In some implementations the method comprises evaluating performance of the external storage resource pool in terms of access operations per unit of time. In some implementations the method comprises evaluating performance of the external storage resource pool in terms of access operations per unit of time per unit of utilized storage capacity. In some implementations the method comprises evaluating performance of the external storage resource pool in terms of service level expectations. In some implementations the method comprises evaluating performance of the external storage resource pool in terms of service level objectives. In some implementations the method comprises evaluating performance of the external storage resource pool of the second data storage system after loading that external storage resource pool with data in an amount calculated to cause cache misses. In some implementations the method comprises selecting currently infrequently accessed data as the loaded data. In some implementations the method comprises using performance pattern analysis to classify the external storage resource pool. In some implementations the method comprises using performance probability curves to classify the external storage resource pool. In some implementations the method comprises determining workload distribution by a margin analysis algorithm that matches workloads and external storage resource pool performance characteristics.

DETAILED DESCRIPTION

Some aspects, features and implementations described herein may comprise computer devices, components and computer-implemented steps or processes that will be apparent to those of ordinary skill in the art. It should be understood by those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of physical processor devices. For ease of exposition, not every step, process or element is described herein as part of a computer system. However, those of ordinary skill in the art will recognize steps, processes and elements that may have a corresponding computer system or software component. Such computer system and software components are therefore enabled by describing their corresponding steps, processes or elements, and are within the scope of the disclosure.

The various devices and components described herein are intended to be interpreted broadly within the limits of subject matter eligibility. The terms "logical" and "virtual" are used herein to refer to devices and components which are abstractions of real devices. For example, multiple virtual computing devices could operate simultaneously on one real computing device. A "host application" is an application that accesses a storage service from a storage system via a storage network, e.g. and without limitation via a standard protocol such as SCSI (small computer system interface). A "volume" is a logical unit presented by a storage system for use by host applications. The storage system is free to manage the underlying physical resources used to implement the storage services for a volume. A "data device" is an entity that is internal to a storage system, and which is used to manage access to storage resources that the storage system uses to deliver storage services. A data device may be internal, in which case it refers to storage that is local to the first storage system, or external, in which case the data device derives from a logical volume that is presented from a second storage system to the first storage system. A "storage resource pool" is a collection of data devices. An "internal storage resource pool" is a storage resource pool of internal data devices. An "external storage resource pool" is a storage resource pool of external data devices. A "performance tier" is a collection of data devices that are classified as either having a similar particular performance profile, or as collectively implementing storage service with a particular performance profile.

Auto-tiering is a technique via which data is placed on selected storage tiers in such a way that the storage system is more capable of meeting storage service performance goals. An auto-tiering system may include procedures for avoidance of overloading of individual storage tiers while ensuring that the performance goals of customer workloads are met. Aspects described below include different ways for the auto-tiering system to make use of storage capacity that is presented to the auto-tiering storage system from an external source, e.g. and without limitation an "external storage array." The external source typically will not be designed or adapted to cooperate with the auto-tiering system by providing configuration and status information, e.g. and without limitation, cache configuration, drive configuration, RAID types, and active workloads from directly connected hosts. One aspect describes procedures for discovering a SLE (Service Level Expectation) for an ePool (e.g. a pool of storage presented to the auto-tiering system by the external storage array). The procedures may include methods for handling the effect of the presence of a cache in the external array, and for managing the impact that the discovery process has on the storage performance service. Knowledge of the SLE of an ePool may enable the auto-tiering system to improve the quality of data placement decisions involving the ePool. For example, the auto-tiering system is better able to avoid resource overload, and has some indication of what response time to expect from the ePool when planning data placement decisions. Another aspect relates to further improving the ability of the external array to exploit the storage service capabilities of an external pool of storage that includes a mixture of classes of storage. By forming an approximation of what the mix with the external array seems to be, the auto-tiering system is better able to identify the mix of workload types that will 'fit' into the external array from a performance perspective. This may translate into more effective use of the storage services of the external array.

Figure 1:
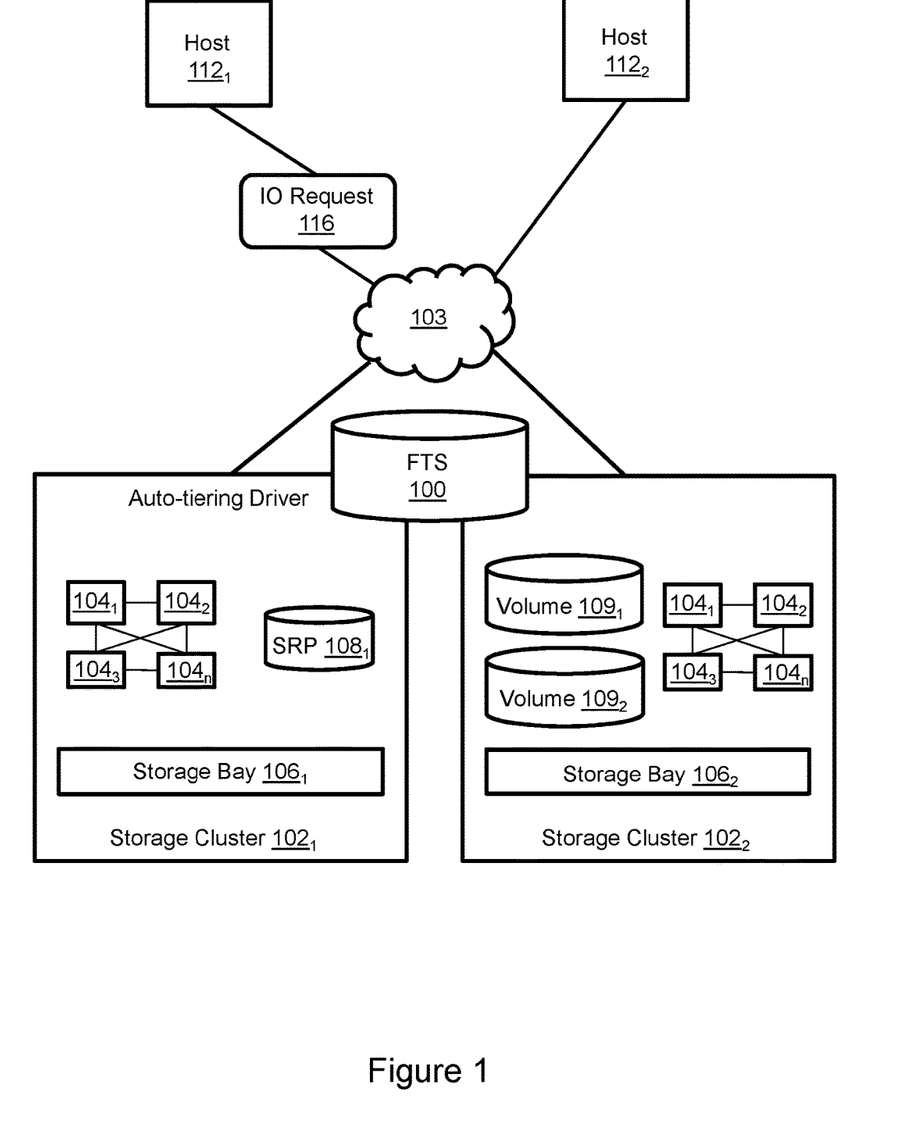
FIG. 1 illustrates a distributed data storage system with federated tiered storage.

FIG. 1 illustrates a distributed data storage system with FTS (federated tiered storage). FTS 100 is storage space for which the backing storage devices and data are distributed across multiple systems such as clusters or data centers, for example and without limitation. Auto-tiering of the FTS is driven by one of the systems. The illustrated distributed data storage system includes storage clusters $102_1$, $102_2$ that are interconnected via a network 103, and storage cluster $102_1$ is the auto-tiering driver. For context and without limitation the network 103 could be a WAN (wide area network) or MAN (metropolitan area network). Each storage cluster $102_1$, $102_2$ includes one or more computing nodes $104_1$-$104_n$ and at least one storage bay $106_1$, $106_2$, respectively. The computing nodes may include specialized storage engine hardware platforms or "vanilla" storage servers, for example and without limitation. Within each cluster, each storage engine is connected to every other storage engine via point-to-point links of an interconnecting fabric. Although the auto-tiering driver will be described as having some local storage resources associated with FTS 100 it should be noted that the concepts may be applied to storage resources that are entirely external with respect to the auto-tiering driver.

Figure 2:
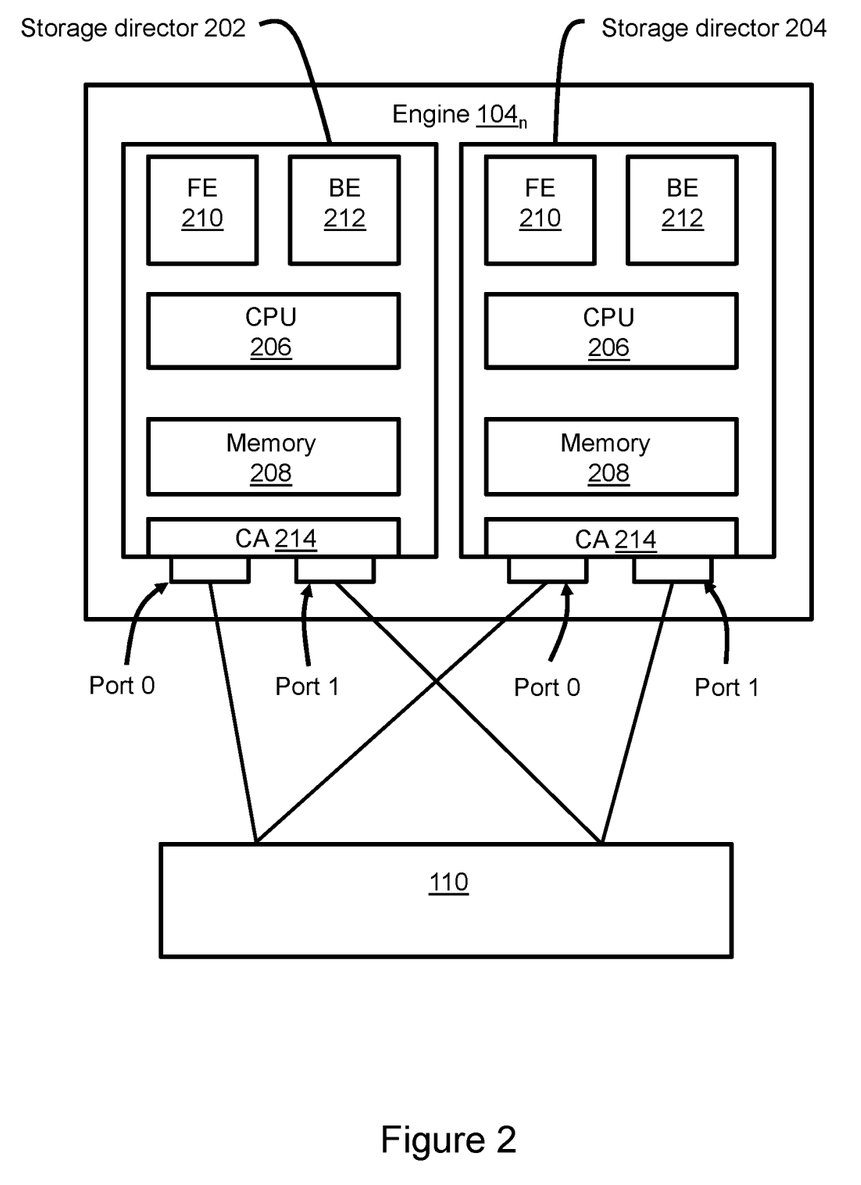
FIG. 2 illustrates a storage engine of the distributed data storage system in greater detail.

FIG. 2 illustrates an implementation of a storage engine $104_n$ (FIG. 1) in greater detail. In the illustrated example the storage engine includes two storage directors 202, 204. Each storage director includes a multi-core CPU 206, a volatile memory cache 208, a front end module 210, a back end module 212, and a channel adapter 214, all of which may be on a single printed circuit board blade. The front end module 210 is configured to interface with host devices $112_1$, $112_2$ (FIG. 1). For example, the front end module presents FTS 100 to the host devices, receives IO requests from host application instances running on the host devices, and provides data to the host application instances in response to read requests. The back end module 212 interfaces with back end physical storage devices in the storage bay. For example, the back end module reads data from and writes data to the back end storage devices. The CPU 206 runs a variety of programs configured to cause the director to perform IOs and other functions related to maintenance, protection and availability of data. Each channel adapter 214 includes two ports, Port 0 and Port 1. The two ports correspond to two switches of the fabric that provides redundant point-to-point connectivity between engines and directors. The memory 208, which may include volatile memory components such as RAM (random access memory) chips for example and without limitation, includes a section which is allocated for temporarily storing data that is being written to or read from the back end storage devices. For example, data that is being written by a host device is initially copied to the memory 208 and subsequently destaged to the back end storage devices. Data that is being read by a host device is copied from the back end storage devices to memory 208 via the back-end module and then provided to the host. Data may be also copied to the cache from the back end storage devices in response to a hint.

Figure 3:
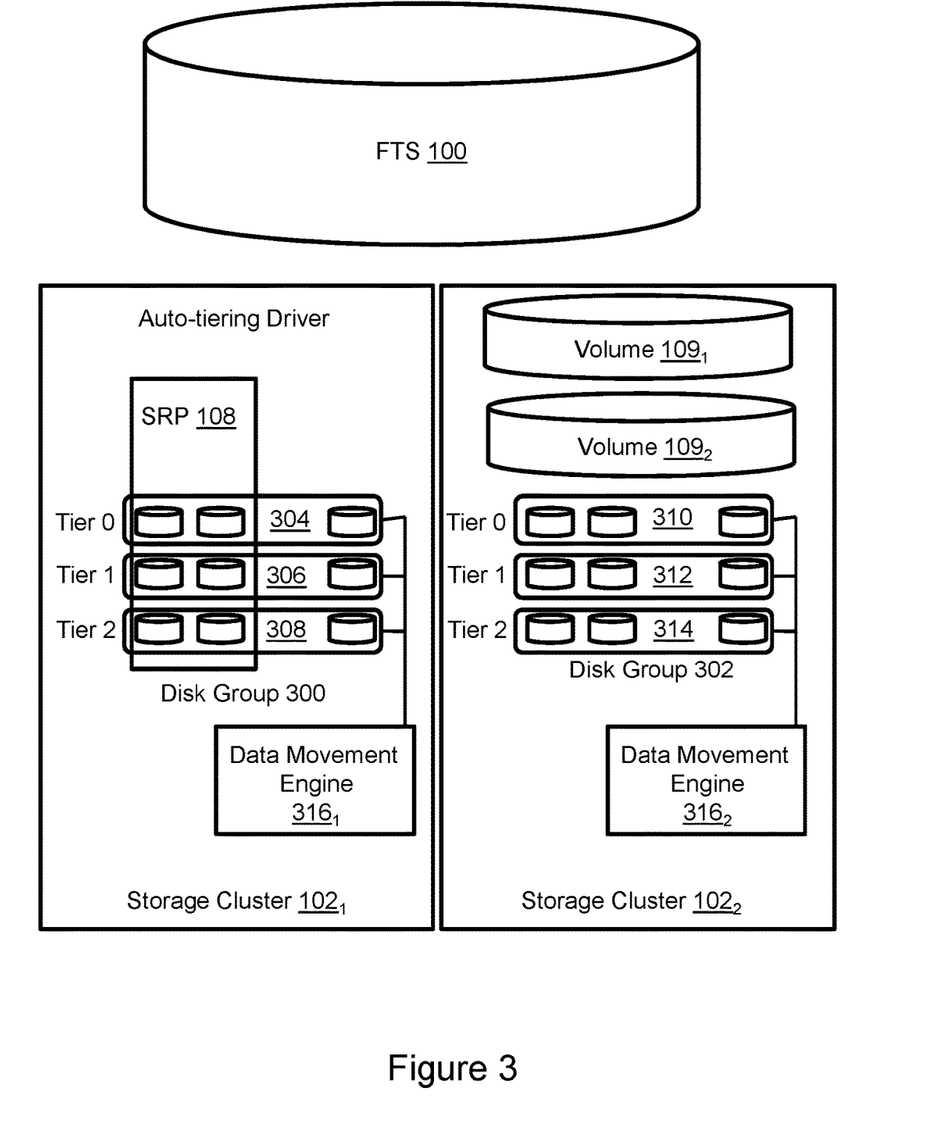
FIG. 3 illustrates organization of storage resources of the distributed data storage system.

Referring to FIGS. 1 and 3, FTS 100 includes storage resources of SRP (storage resource pool) 108 in cluster $102_1$ and volumes $109_1$, $109_2$ presented by cluster $102_2$. SRP 108 includes some or all storage resources of disk group 300 of storage cluster $102_1$. Volumes $109_1$, $109_2$ are logical representations of some or all storage resources of disk group 302 of storage cluster $102_2$. The volumes are presented to the FTS auto-tiering driver, i.e. storage cluster $102_1$ in the illustrated example. Each disk group 300, 302 includes one or more pools of data storage devices. In the illustrated example disk group 300 includes pools 304, 306, 308 at tier 0, tier 1 and tier 2, respectively, and disk group 302 includes pools 310, 312, 314 at tier 0, tier 1 and tier 2, respectively. The tier numbers correspond to levels of performance of storage devices in a particular pool. For example and without limitation, devices of the same technology type may be in each pool. Purely for context and without limitation tier 0 may include flash drives, tier 1 may include 15 k rpm disk drives and tier 2 may include 7 k rpm disk drives. The auto-tiering driver is aware of the tiers with which the storage resources allocated to SRP 108 are associated because those storage resources are local, e.g. and without limitation the performance characteristics of SRP 108 including all its components such as storage pools 304, 306 and 308 are known in some format of response time versus IO profile presented as a mixture of reads, writes and transfer rates for each. However, the auto-tiering driver has limited information about volumes $109_1$, $109_2$ because those volumes are backed by external devices. For example, the auto-tiering driver may initially only know the volume IDs, volume sizes and address ranges. In some implementations FTS 100 may include only volumes backed by external devices. Further complicating the scenario, data movement engines $316_1$, $316_2$ at storage clusters $102_1$, $102_2$ respectively may perform independent tiering decisions so auto-tiering driver cluster $102_1$ does not determine or have knowledge of the tier on which an extent of data is stored by storage cluster $102_2$. For example, data movement engine $316_2$ independently promotes and demotes extents of data between tiers based on frequency of access and hints so an extent on FTS 100 may be moved between tiers in cluster $102_2$ without any indication being provided to cluster $102_1$. One or both storage clusters may also present other logical storage volumes so the data associated with those other volumes may be included in tiering decisions made by the data movement engines and also contribute to TOPS loading and capacity utilization of the storage devices associated with volumes $109_1$, $109_2$. Thus, the level of performance, e.g. in terms of response time, that might be expected when accessing the volumes associated with FTS 100 is generally unknown to, and beyond the control of, auto-tiering driver storage cluster $102_1$. This complicates associating storage resources of FTS 100 with specific tiers.

Figure 4:
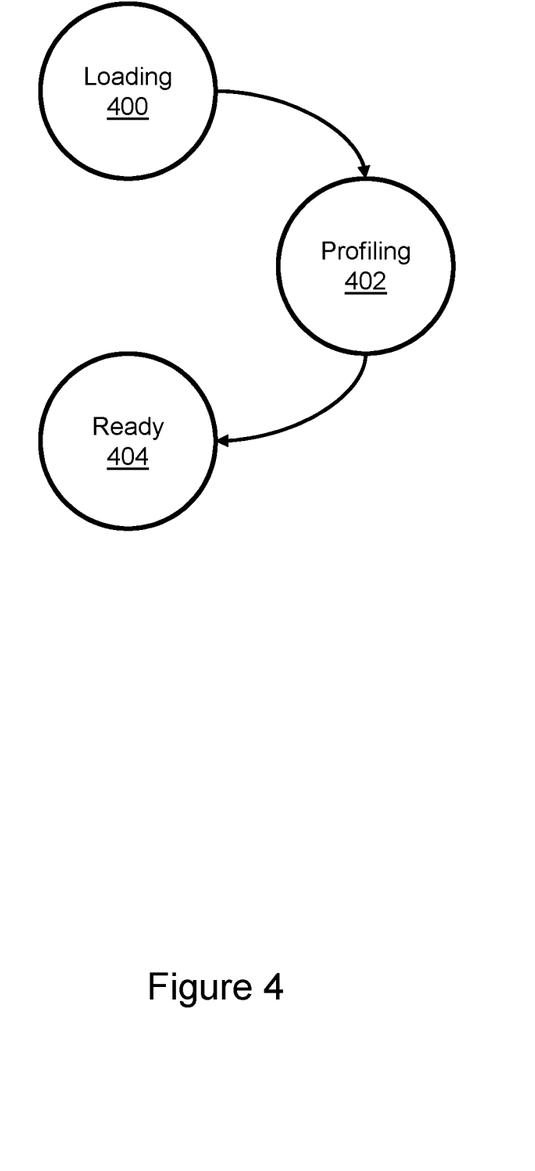
FIG. 4 is a state diagram of calibration modeling of an external storage resource pool.

FIG. 4 is a state diagram of a technique for calibration modeling of an ePool. An ePool is a storage resource that is external relative to a cluster, and about which the cluster does not have knowledge of device technology type or control over tiering decisions. For example, volumes $109_1$, $109_2$ may be considered as separate ePools from the perspective of auto-tiering driver cluster $102_1$ (FIG. 1). Calibration modeling provides an indication of the level of performance that might be expected from the ePools. The indication may be used for FTS tiering classifications. For purposes of explanation volume $109_2$ (FIG. 3) may be an ePool backed by 15 k type disk drives from pool 312 (FIG. 3), but that information is unknown to cluster $102_1$ (FIG. 1). The ePool calibration state model has three states: loading 400, profiling 402, and ready 404. The illustrated state model only allows transitions in one direction. Initially, the ePool is in the loading state 400. In the loading state some amount of data is stored on the ePool in order to establish a performance baseline. In one implementation the data that is loaded on the ePool includes relatively infrequently accessed "cool" data, e.g. the low end of the skew distribution as described in U.S. patent application 14/751,861 entitled Allocation Method for Meeting System Performance and Application Service Level Objective (SLO), which is incorporated by reference, although this should not be viewed as limiting. In general, the amount of data stored in the ePool may be calculated to be sufficient to load the ePool to a capacity point that decreases or effectively eliminates the likelihood that all accessed data will be resident in volatile memory of the remote cluster. In the context of the illustrated example, volume $109_2$ (FIG. 3) with which the ePool is associated should be loaded with enough data such that at least some IOs will result in data access from backend storage, e.g. the 15 k drives of pool 312 in the specifically described example. Once the calculated data load capacity point is reached the state transitions to profiling 402.

Figure 5:
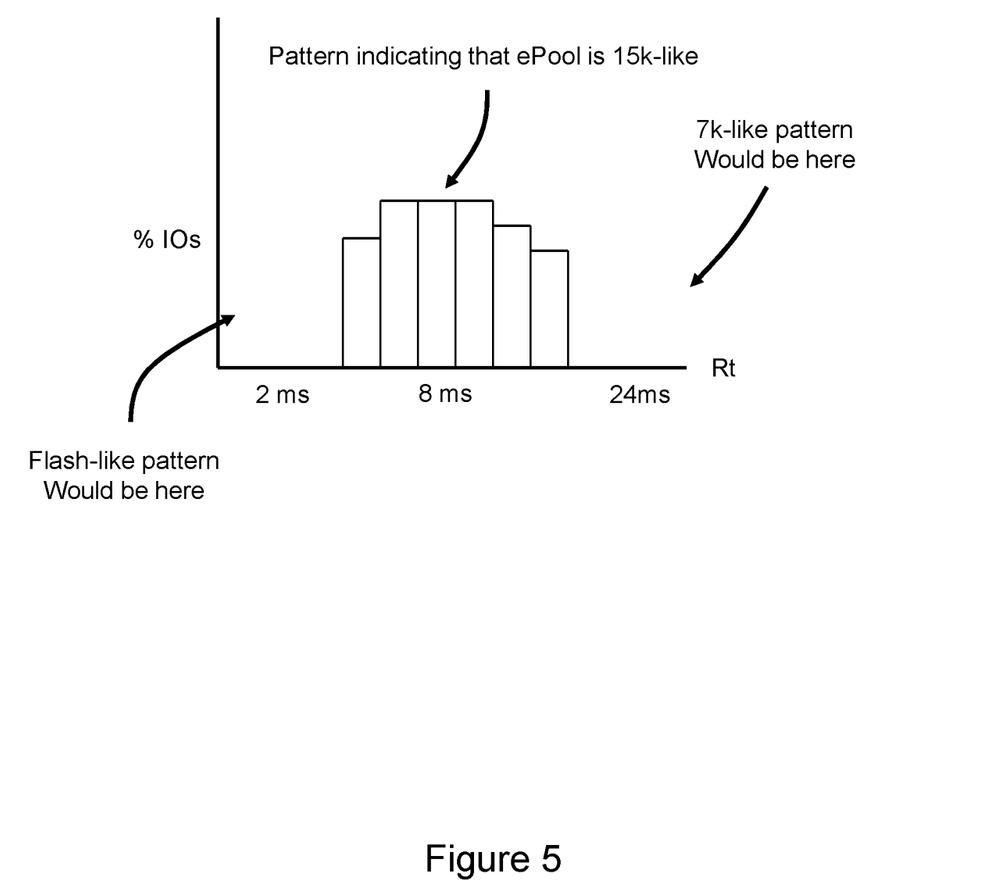
FIG. 5 is a performance profile of an external resource pool.

Referring to FIGS. 4 and 5, in the profiling state 402, data mining calibration is conducted to identify meaningful data access "patterns," where a pattern may be a pair of a set of measures and its occurrence. Operational performance of access to an ePool such as volume $109_2$ is observed and workload performance patterns are stored in a database. Records in the database may be indicative of response time (RT) for individual IOs or counts of IOs at each value of a set of RT values that form a histogram which is a distribution of RT. FIG. 5 is one representation of such data with % of IOs in the y-axis and corresponding RT values on the x-axis. Some data grooming may be performed. For example, the exemplary ePool consisting of 15 k disks behind cache might exhibit occurrences of 3 ms response times due to "cache hits." However, a capacity loading point sufficient to induce "cache misses" should cause the ePool to also exhibit frequent occurrence of response times of about 8 ms, which corresponds to the rotational latency when accessing the 15 k disks. Pattern collection may be bounded by elapsed time or a target number of consistent captured patterns, for example and without limitation. Based on analysis of the collected patterns the ePool is classified into a category associated with a SLE (service level expectation). The SLE is an indication of a level of performance that the ePool is expected to exhibit, e.g. 7 k-like media with an expected 24 ms RT 15 k-like media with an expected 8 ms RT or flash-like media with an expected 2 ms RT. In the illustrated example volume $109_2$ is classified as 15 k-like based on patterning associated with a distribution of response times clustered around 8 ms. However, a wide variety of performance level classifications could be used so the SLE should not be viewed as limited to technology type-like classifications. The state then transitions into Ready 404.

Figure 6:
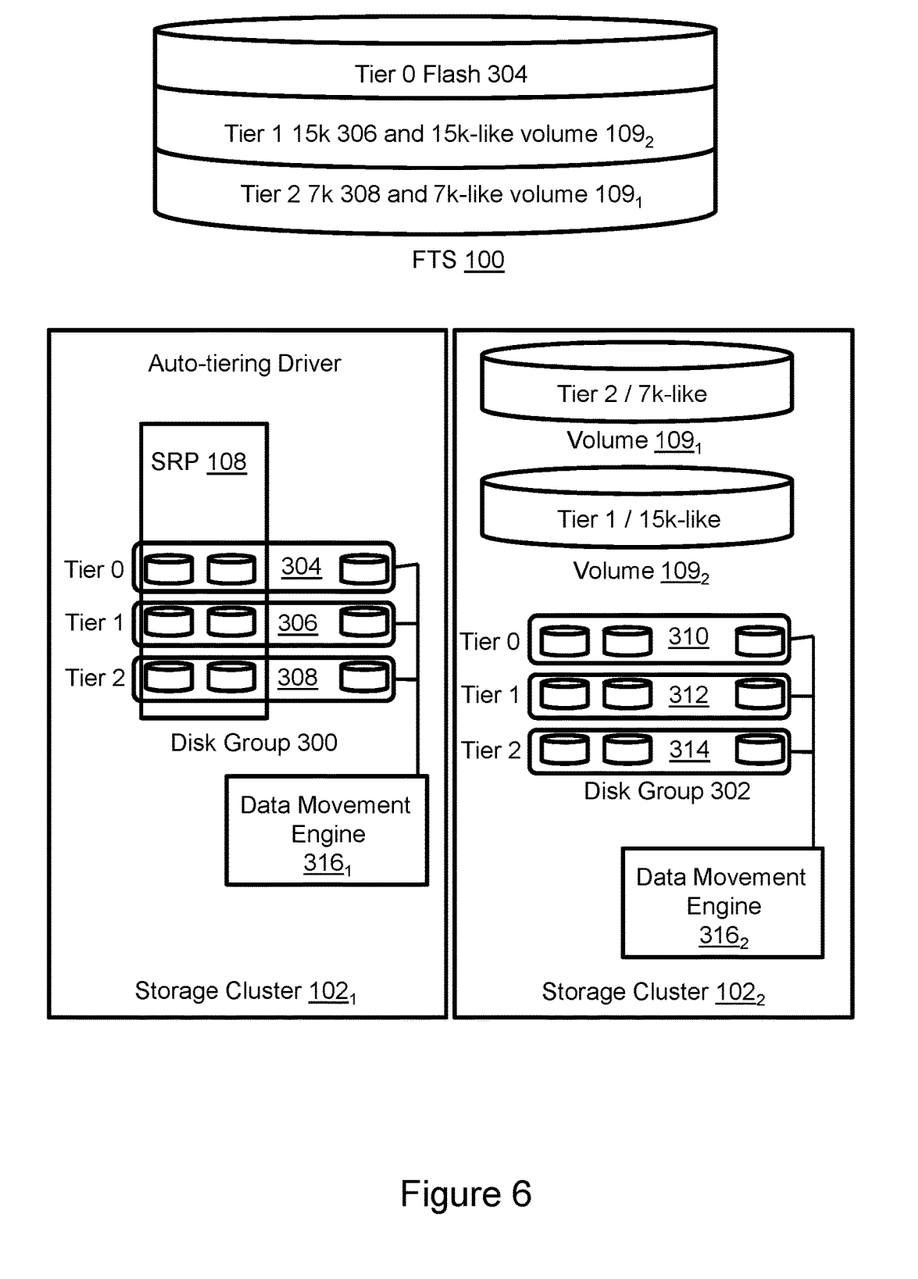
FIG. 6 illustrates organization of classified storage resources of the distributed data storage system.

Referring to FIGS. 4 and 6, in the ready state 404 the calculated SLE value is applied to enable automated tiering of FTS 100 from the perspective of auto-tiering driver cluster $102_1$. In the illustrated example volume $109_2$ has been classified as 15 k-like, which is tier 1 storage in accordance with the designations of disk group 300. Consequently, the storage capacity contribution of volume $109_2$ to FTS 100 is allocated to tier 1 of tiered FTS 100. More particularly, FTS 100 includes a tier 1 storage capacity which is backed by disk pool 306 and volume $109_2$. Tier 0 of FTS 100 is backed by disk pool 304. Assuming volume $109_1$ is classified as 7 k-like in accordance with the concepts described above then FTS tier 2 is backed by disk pool 308 and volume $109_1$. This type of classification may be particularly effective when each ePool consists of storage devices of a single technology type. For example, a 15 k-like ePool may actually be a pool of 15 k disk drives. It should be noted however that classification is not limited to volumes. For example and without limitation, sub-volume ranges of addresses could be classified separately.

Figure 7:
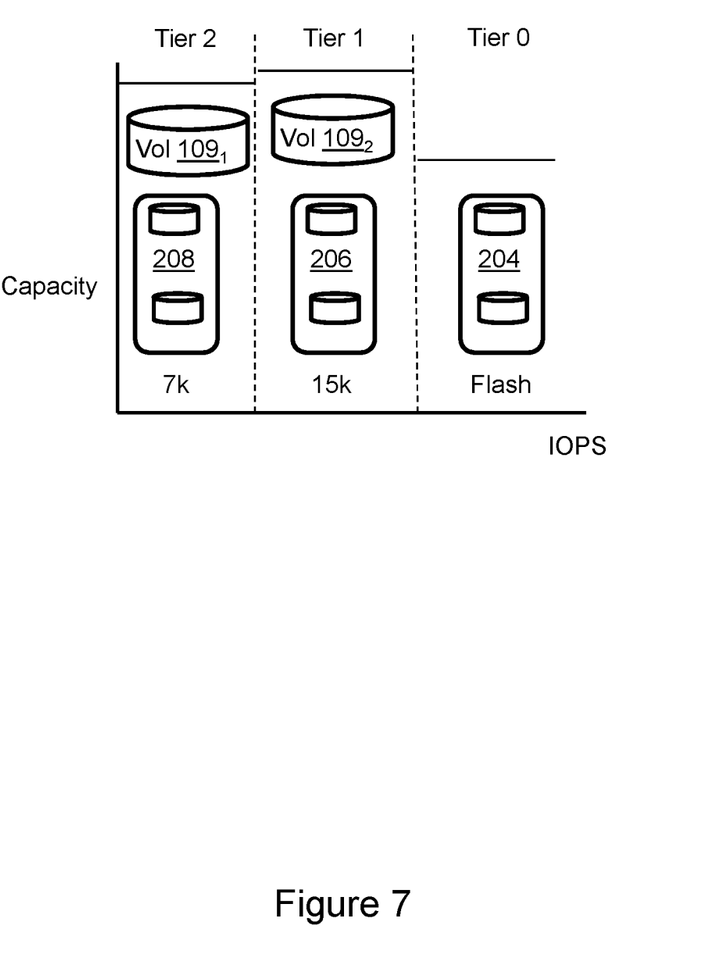
FIG. 7 illustrates workload distribution.

FIG. 7 illustrates workload distribution that may be particularly effective when individual ePools predominantly include storage devices of a single technology type, although that should not be viewed as limiting and the ePool may include storage device in any mix of technology types. Each tier of FTS 100 represents a SLE performance band, e.g. expected performance in terms of IOPS (IO operations per second). Factors such as data access frequency and hints may be used to locate data on a tier of FTS 100. A wide variety of automated storage tiering techniques may be used to locate data on a particular tier, and perform promotion and demotion between tiers.

Figure 8:
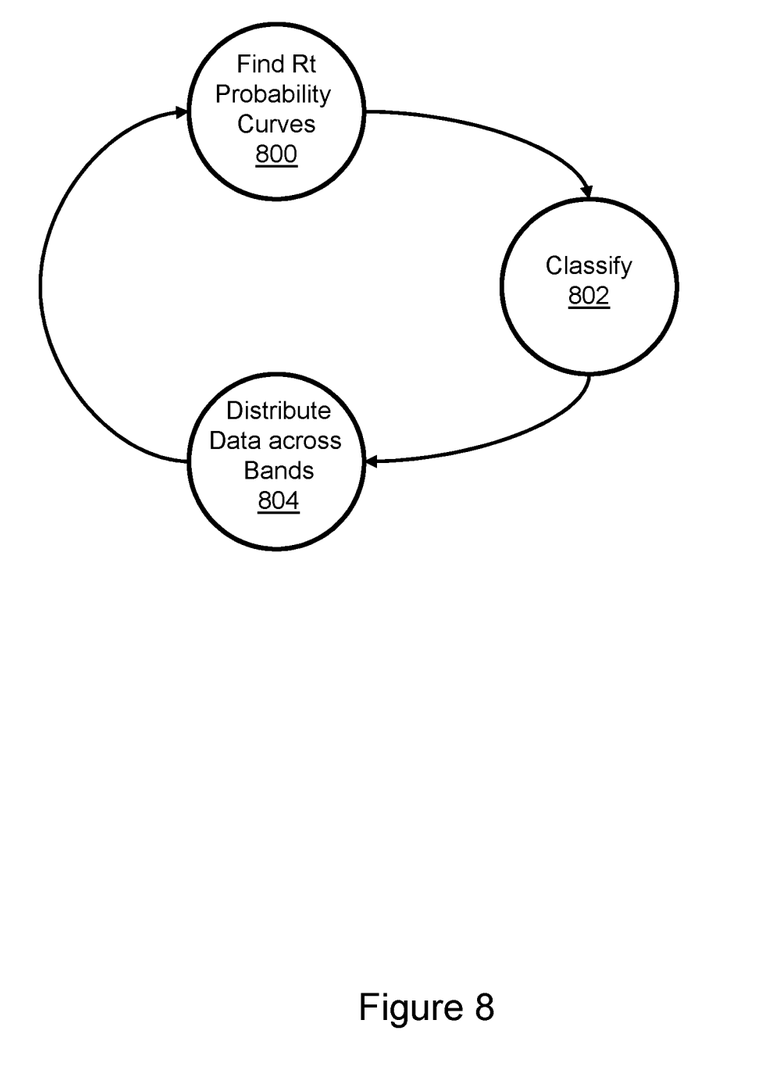
FIG. 8 is a state diagram of another aspect of calibration modeling of an external storage resource pool.

FIG. 8 is a state diagram of another aspect of calibration modeling of an ePool that may be particularly effective when the ePool includes storage devices of different technology types, although that should not be viewed as limiting. Volumes $109_1$, $109_2$ (FIG. 1) as ePools from the perspective of auto-tiering driver cluster $102_1$ (FIG. 1) will again be used as an example, but it is now assumed that the volumes each include a mix of storage resources from pools 310, 312 and 314 (FIG. 3). In state 800 response time probability curves are calculated for each ePool. The exhibited response times are not merely a function of storage device technology type. Factors including but not limited to IOPS loading, access type, and read/write mix can each influence response times. For example, optimal response for a device may only be provided up to some IOPS limit, and some devices may exhibit different response times for reads versus writes, and be less efficient at servicing mixed reads and writes in comparison with all reads or all writes. The probability curves can be used in state 802 to classify the ePools using SLO (service level objective) terms. An SLO is a performance level demanded of the storage system. For example, SLOs may be indicative of levels of performance experience of individual applications, e.g. by measuring a weighted average IO response time of a targeted storage group. For context and without limitation, ePools could be classified according to performance and availability SLO terms such as "diamond" which exhibits >3 IOPS/GB, "platinum" which exhibits 1-3 IOPS/GB, "gold" which exhibits 0.5-1 IOPS/GB, "silver" which exhibits 0.25-0.5 IOPS/GB, and "bronze" which exhibits <0.25 IOPS/GB. In state 804 data is distributed across the bands.

Figure 9:
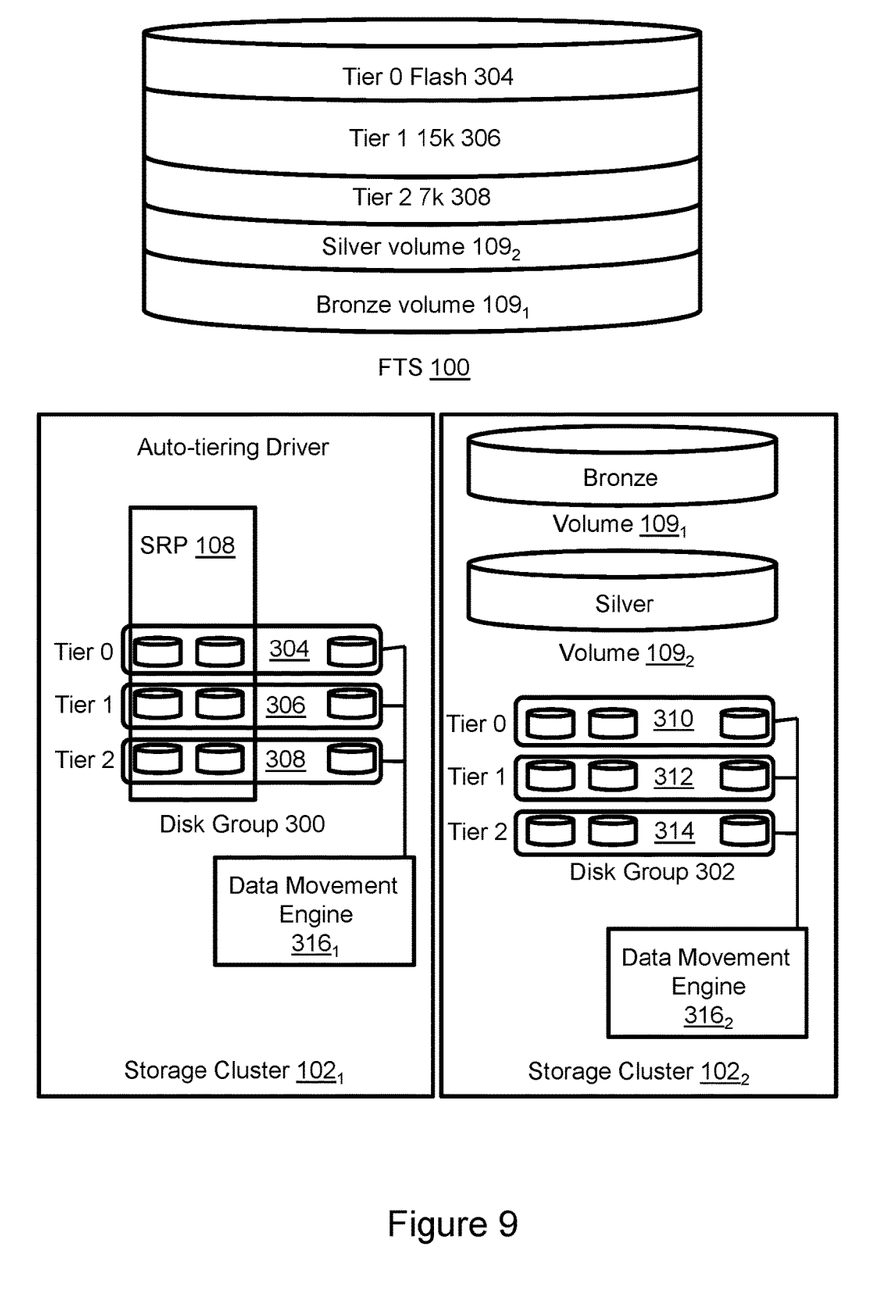
FIG. 9 illustrates another aspect of organization of classified storage resources of the distributed data storage system.

FIG. 9 illustrates organization of classified storage resources of the distributed data storage system in accordance with SLO probability curves. In the illustrated example volume $109_1$ is classified as bronze and volume $109_2$ is classified as silver. Consequently, FTS 100 is classified as having a tier 0 backed by flash pool 304, a tier 1 backed by 15 k disk drive pool 306, a tier 2 backed by 7 k disk drive pool 308, a silver level backed by volume $109_2$, and a bronze level backed by volume $109_1$.

Figure 10:
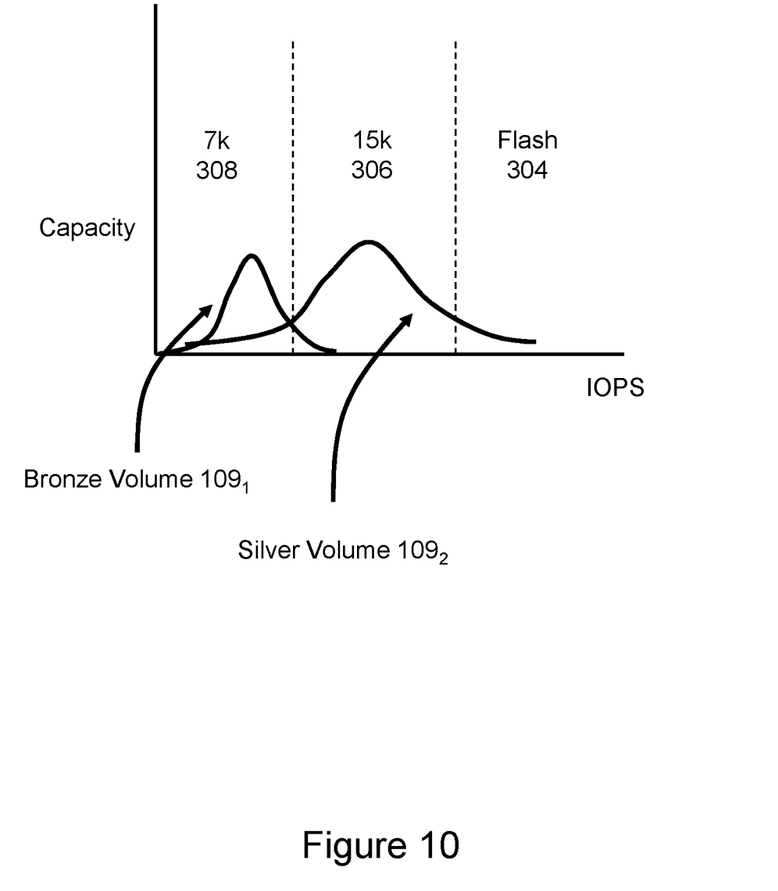
FIG. 10 illustrates another aspect of workload distribution.

FIG. 10 illustrates distribution of data on classified ePools superimposed on the SLE band-based distribution of data on storage pools 304, 306, and 308. More particularly, a first distribution is shown for the case where volume $109_2$ is classified as silver-type SLO, and volume $109_1$ is classified as bronze-type SLO. The distribution of data on the SLO-type classified ePools is not limited to a particular SLE band and may be used to store data associated with multiple SLE bands. This allows the data movement engines to maintain pool workloads based on a workload distribution function so that a mixture of IOPS workloads can be combined in the same storage pool. The workload distribution or a mixture of various workloads is determined by a margin analysis algorithm that matches workloads and pool performance characteristics in SLO terms. For example, some portion of idle data may be maintained in a 15 k pool that has very large capacity instead of pushing that data to a 7 k pool. The ePool may be classified as performing like a platinum pool for X type of workload profile and with Y amount of tolerance, for example. By forming an approximation of the mix of tiers associated with the external array the auto-tiering system is better able to identify the mix of workload types that can be stored thereon from a performance perspective. This translates into more effective use of the storage services of the external array where the ePool includes devices of different performance characteristics.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a first data storage system comprising:
a computing node; and
a plurality of storage resource pools, at least one of the storage resource pools being an external storage resource pool;
wherein the first data storage system classifies the storage resource pools as multiple performance tiers and manages extent-level auto-tiering across the performance tiers to avoid overloading performance capacity of the storage resource pools; and
wherein classification of the external storage resource pool comprises calibration modeling.

2. The apparatus of claim 1 wherein performance of the external storage resource pool is measured in terms of access operations per unit of time.

3. The apparatus of claim 1 wherein performance of the external storage resource pool is measured in terms of access operations per unit of time per unit of utilized storage capacity.

4. The apparatus of claim 1 wherein performance of the external storage resource pool is measured in terms of service level expectations.

5. The apparatus of claim 1 wherein performance of the external storage resource pool is measured in terms of service level objectives.

6. The apparatus of claim 1 wherein the external storage resource pool belongs to a second data storage system, and wherein performance of the external storage resource pool is evaluated after that external storage resource pool is loaded with data in an amount calculated to cause cache misses.

7. The apparatus of claim 6 wherein the loaded data is currently infrequently accessed.

8. The apparatus of claim 1 wherein performance pattern analysis is used to classify the external storage resource pool.

9. The apparatus of claim 1 wherein performance probability curves are used to classify the external storage resource pool.

10. The apparatus of claim 1 wherein workload distribution is determined by a margin analysis algorithm that matches workloads and external storage resource pool performance characteristics.

11. A method comprising:
using a first data storage system comprising a computing node and a plurality of storage resource pools, at least one of the storage resource pools being an external storage resource pool:
classifying the storage resource pools into multiple performance tiers, comprising using calibration modeling to classify the external storage resource pool; and
managing extent-level auto-tiering across the performance tiers to avoid overloading performance capacity of the storage resource pools.

12. The method of claim 11 comprising evaluating performance of the external storage resource pool in terms of access operations per unit of time.

13. The method of claim 11 comprising evaluating performance of the external storage resource pool in terms of access operations per unit of time per unit of utilized storage capacity.

14. The method of claim 11 comprising evaluating performance of the external storage resource pool in terms of service level expectations.

15. The method of claim 11 comprising evaluating performance of the external storage resource pool in terms of service level objectives.

16. The method of claim 11 wherein the external storage resource pool belongs to a second data storage system, and comprising evaluating performance of the external storage resource pool of the second data storage system after loading that external storage resource pool with data in an amount calculated to cause cache misses.

17. The method of claim 16 comprising selecting currently infrequently accessed data as the loaded data.

18. The method of claim 11 comprising using performance pattern analysis to classify the external storage resource pool.

19. The method of claim 11 comprising using performance probability curves to classify the external storage resource pool.

20. The method of claim 11 comprising determining workload distribution by a margin analysis algorithm that matches workloads and external storage resource pool performance characteristics.

\* \* \* \* \*